United States Patent [19]

Mealey

[11] Patent Number: 4,946,591
[45] Date of Patent: Aug. 7, 1990

[54] TUBULAR SUPPORT WITH INPERFORATE PLASTIC SHEET AND FILTER CLOTH STRAINER

[76] Inventor: Andrew N. Mealey, 4610 Toland Way, Los Angeles, Calif. 90041

[21] Appl. No.: 370,622

[22] Filed: Jun. 23, 1989

Related U.S. Application Data

[63] Continuation-in-part of Ser. No. 263,046, Oct. 26, 1988, abandoned.

[51] Int. Cl.$^5$ ............................................. B01D 29/085
[52] U.S. Cl. ..................................... 210/474; 210/479; 210/482; 210/497.2
[58] Field of Search ............... 210/464, 469, 473, 474, 210/477, 478, 479, 480, 481, 482, 497.2, 497.01, 448, 452

[56] References Cited

U.S. PATENT DOCUMENTS

| | | | |
|---|---|---|---|
| 484,459 | 10/1892 | Reynolds | 248/94 |
| 485,545 | 11/1892 | Halt | 141/344 |
| 486,762 | 11/1892 | Camden | 141/341 |
| 500,517 | 6/1893 | Thompson | 248/94 |
| 508,175 | 11/1893 | Leggett | 210/474 |
| 597,483 | 1/1898 | Talbert | 210/469 |
| 658,848 | 10/1900 | Hirsch | 248/94 |
| 970,398 | 9/1910 | Sapp | 210/473 |
| 1,599,835 | 9/1926 | Nelson | 210/474 |
| 2,315,842 | 4/1943 | Dariana | 210/474 |
| 2,572,963 | 10/1951 | Wiley | 210/474 |
| 2,667,976 | 2/1954 | Weidrer | 210/469 |
| 2,883,057 | 4/1959 | Richards | 210/476 |
| 2,907,052 | 10/1959 | Louis et al. | 210/464 |
| 4,025,435 | 5/1977 | Shea | 210/250 |
| 4,176,588 | 12/1979 | Baron | 99/323 |

Primary Examiner—Richard V. Fisher
Assistant Examiner—Wanda L. Millard
Attorney, Agent, or Firm—Christie, Parker & Hale

[57] ABSTRACT

A strainer assembly for straining a liquid such as paint to be poured into the interior of an open top container includes a tubular strainer support having a continuous imperforate side wall structure with an open top, an open bottom, and an annular exterior flange for removably resting on the open top of the container for holding the strainer support in an upright position above the container. A filtering medium secured to the open top of the strainer support includes, in one ebmodiment, a thin, flexible tubular imperforate plastic sheet having an open top which is taped to the upper exterior portion of the strainer support. The flexible plastic sheet extends downwardly for most of the distance into the interior of the strainer support. A flexible mesh filtering cloth secured to the bottom of the tubular plastic sheet extends across a major portion of the projected area of the strainer support interior adjacent the top of the container. Paint is poured into the interior of the strainer support and through the mesh filtering cloth at the bottom to filter the paint before it passes into the interior of the container. In one embodiment, the strainer support is of stackable configuration and includes upper and lower annular exterior mounting flanges and a horizontally disposed, abrupt, annular step inside the support near its top for resting on top of the annular upper flange of a similar strainer support stacked below it.

19 Claims, 4 Drawing Sheets

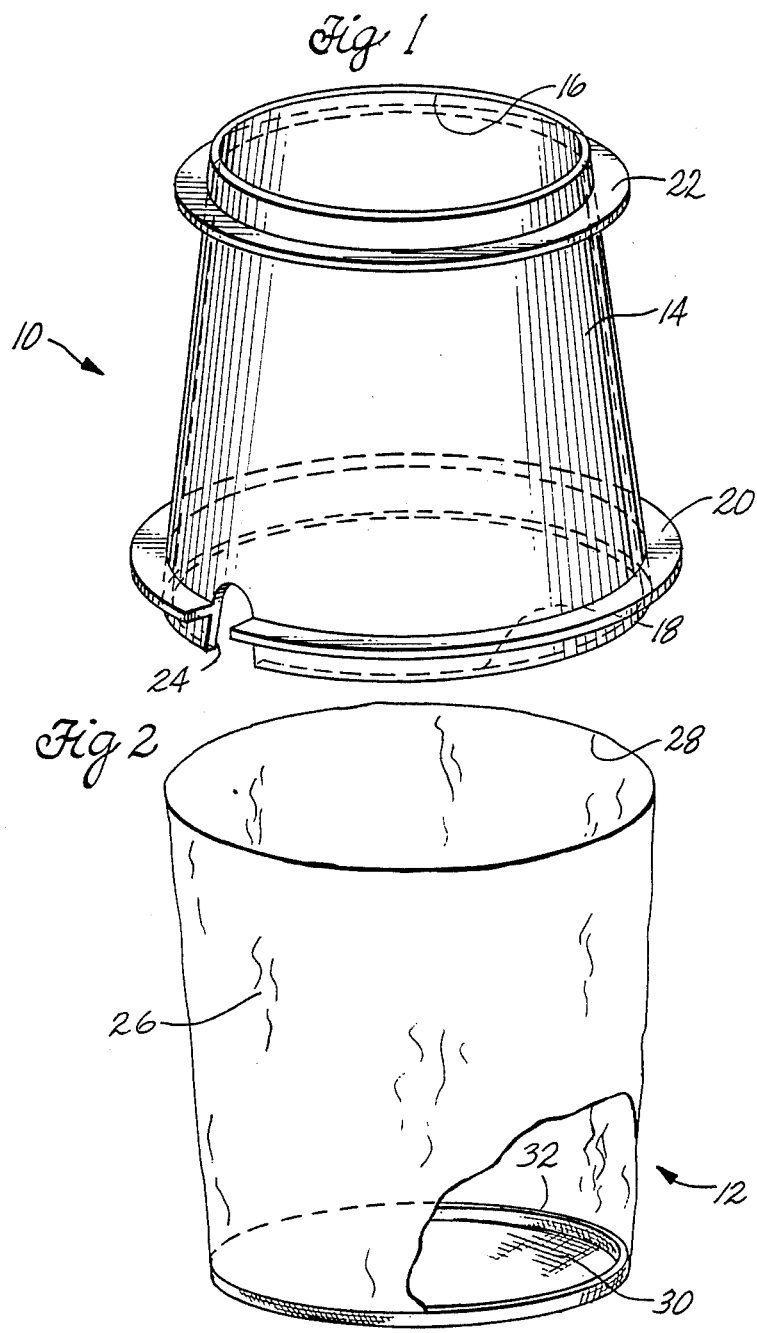

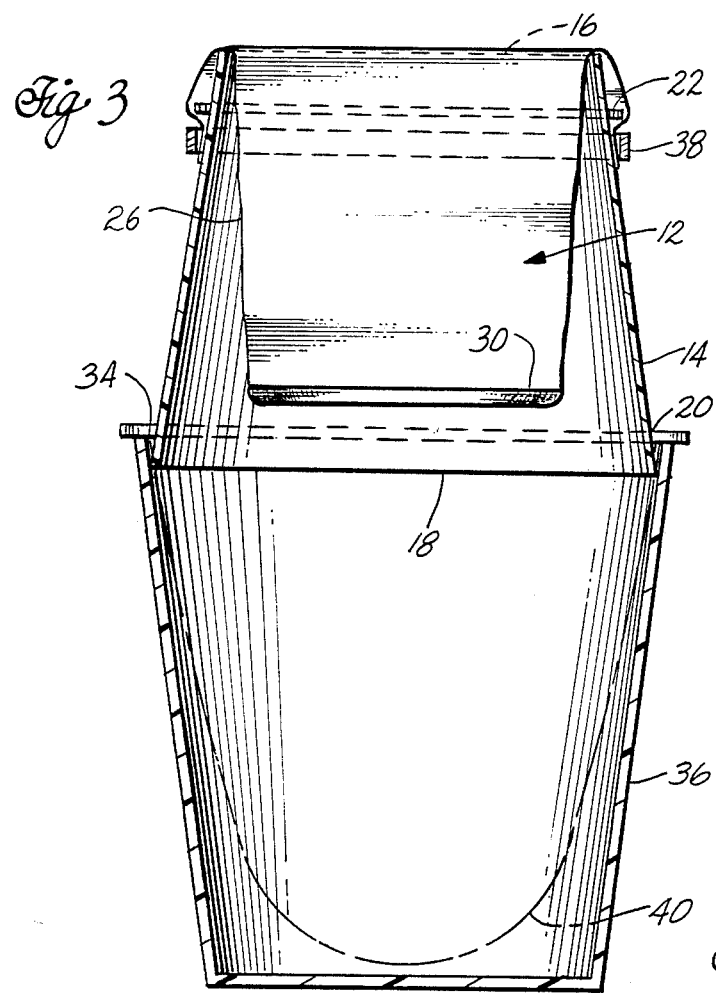
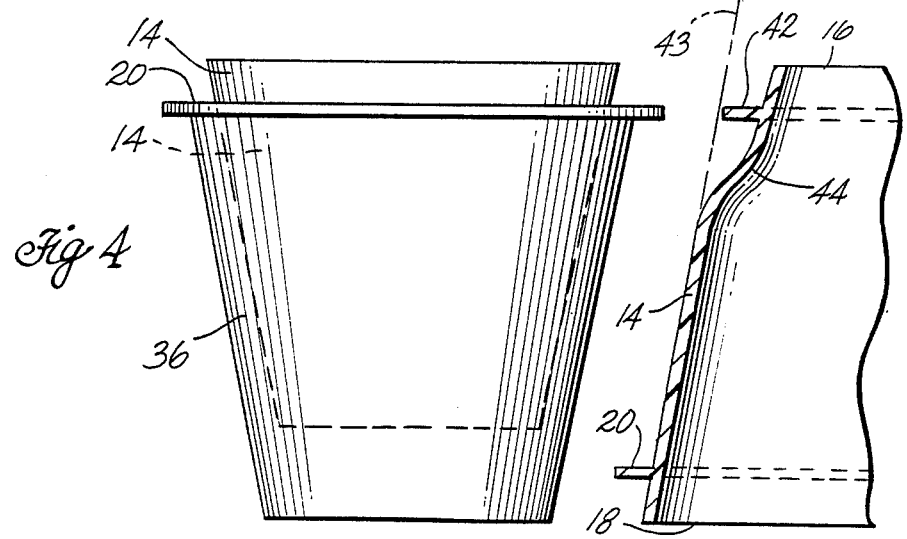

TUBULAR SUPPORT WITH INPERFORATE PLASTIC SHEET AND FILTER CLOTH STRAINER

CROSS-REFERENCE

This is a continuation-in-part of my patent application Ser. No. 07/263,046, filed Oct. 26, 1988, now abandoned.

FIELD OF THE INVENTION

This invention relates to a strainer assembly, and more particularly, to apparatus for supporting a filter medium for use in filtering paint, although the invention has utility in the filtering of other materials.

BACKGROUND OF THE INVENTION

The background of this invention will be described as it relates to the filtering of paint, although it will be understood from the disclosure to follow that the invention is also applicable to the filtering of other materials.

When professional painters use an airless spray gun, they first filter or strain the paint so it will not clog the tiny nozzle in the spray gun.

Typically, the do-it-yourself user of an airless spray gun bought at the local hardware store is not even aware that paint should be filtered before use. As a result, an airless spray gun is often clogged after a single use, after the paint in it has dried; and the spray gun cannot be reused unless a new nozzle is purchased and installed.

The present invention is a system that professional painters or do-it-yourself painters can use to strain or filter paint prior to using the paint in an airless spray gun. In the prior art, professional painters have typically filtered paint prior to using the spray equipment, by first placing a tapered filter cloth inside an empty paint bucket. The painter then pours the paint into the interior of the filter cloth so that the paint passes through the pores in the filter cloth to strain the paint. Since the prior art filter cloth is tapered generally to the shape of the paint bucket and extends down to near the bottom of the bucket, the painter must pour the paint into the bucket and then raise the filter cloth to ensure that all the paint passes through the cloth and into the bucket. This job is inconvenient, messy, tedious, and places a strain on the painter's back when constantly filtering paint in this manner. The filter cloth is often pulled into the bucket by the weight of the paint, and consequently, unfiltered paint will spill into the bucket, slowing down the filtering process. The tapered bottom of the conventional filter cloth also can tend to cause paint to clog the bottom of the filter cloth, which also slows down the filtering process. When the painter pulls the filter cloth upwardly out of the bucket, the clogged bottom portion adds to the weight of the filter, placing a strain on the back of the painter who must hold the filtering cloth over the bucket until all paint has finally passed through it.

Several prior art patents are directed to solving some of the problems that have persisted in the conventional procedure for filtering paint. U.S. Pat. No. 4,025,436 to Shea discloses a large frame for holding a tapered filter cloth over the top of a paint bucket. U.S. Pat. No. 2,883,057 to Richards discloses a paint strainer in the form of a conical funnel with a wire mesh screen mounted in the top of the funnel. The funnel is supported on the top of the paint bucket by a wire rod attachment. Other strainers are disclosed in U.S. Pat. No. 508,175 to Leggett and 484,459 to Reynolds. These patents disclose wire rod supports for holding a filtering cloth or wire mesh screen over the top of a paint bucket.

The prior art approaches to improving paint filtering allow the painter to pour the paint through a supported filter without requiring the painter to hold the filter cloth above the container until all the paint drips through the cloth. However, these devices have several disadvantages. They require special, relatively expensive filtering devices. They tend to be bulky, heavy and awkward to use. They can require extra time for assembling parts of the filtering assembly. They can be messy to use, and are not easily stored when not in use. In addition, they do not prevent debris or other foreign particles from entering into the paint during the filtering process. Moreover, they leave the top surface of the paint exposed to the environment, and this can cause the top of the paint to skin over rather quickly, especially during hot weather. The prior art devices also are not adapted to facilitate more inexpensive mass production techniques.

The present invention solves the problems that result from the common prior art practice of filtering paint by pouring it through the tapered filtering cloth and then raising the cloth up through the filtered paint. In addition, the present invention overcomes problems not solved by the improvements described in the prior art patents referred to above.

SUMMARY OF THE INVENTION

Briefly, this invention provides a strainer assembly for straining a liquid such as paint to be poured into the interior of an open top container. The strainer assembly includes a tubular strainer support having a continuous imperforate side wall structure with an open top, an open bottom, and an annular exterior flange for removably resting on the open top of the container. This holds the strainer support in an upright position above the container. A filtering medium is releasably secured to the open top of the strainer support and disposed in the interior of the support. In one form of the invention, the filtering medium comprises a thin, flexible tubular sheet having an open top which is attached to the open top of the strainer support, so the tubular portion of the sheet can extend a substantial distance downwardly into the interior of the strainer support. A flexible filtering cloth at the bottom portion of the tubular sheet extends across a major portion of the projected area within the interior of the strainer support. The filtering cloth is held in a stabilized position inside the support immediately above the open top of the container, and provides a means for filtering paint or other liquid poured through it and into the container. The top of the container is closed off from the exterior environment by the strainer support and the filtering medium. This provides a means for preventing debris or adverse environmental conditions from affecting the filtered material which has passed through the filtering cloth.

In one form of the invention, the tubular sheet of the filtering apparatus can be a thin, flexible, imperforate plastic sheet. In use, the flexible plastic sheet can prevent the liquid poured into the filter from passing through and coating the interior wall of the strainer support. In another form of the invention, the strainer support can be inverted conical in shape to further prevent contact between the filtering apparatus and the inside wall of the strainer support.

A further embodiment of the strainer support includes a first exterior annular supporting flange adjacent a relatively wider open bottom of the support, and a second exterior annular supporting flange adjacent a relatively smaller open top of the strainer support. This double-flange arrangement provides a means for supporting the strainer support interchangeably on the top of a larger container, or on the top of a smaller container (by inverting the strainer support). The second flange also improves attachment of the filtering medium to the exterior of the strainer support. Other advantages also are provided.

In another embodiment of the invention, the strainer support has a generally tapered outer wall between a relatively wider open bottom and a relatively smaller open top. A first exterior annular flange extends around the support above and adjacent to the open bottom, and a second exterior annular flange extends around the support below and adjacent to the open top of the support. An annular ridge extends around the support below the second flange to provide an internal step for engaging the second flange of an identical strainer support when stacking the strainer supports one on top of the other.

The invention is especially useful in filtering paint quickly and easily. For straining paint, the strainer support is simply placed on top of the empty container, and the filtering medium is simply taped to the exterior of the support for holding it in place inside the support and above the container. The paint is then poured through the filter cloth which traverses a substantial area near the bottom of the support so the paint passes through the filter relatively easily, without clogging the bottom of the filter. No complex mechanical parts need to be assembled or disassembled, filtering is done in a clean manner, and the filter apparatus is reasonably inexpensive to replace often. Debris cannot enter the filtered paint and the paint which has been filtered does not skin over during hot weather.

These and other aspects of the invention are more fully understood by referring to the following detailed description and the accompanying drawings.

BRIEF DESCRIPTION OF THE DRAWINGS

FIG. 1 is a perspective view showing one embodiment of a strainer support according to principles of this invention.

FIG. 2 is a perspective view showing a filtering medium according to principles of this invention.

FIG. 3 is a cross-sectional elevation view illustrating the invention during use.

FIG. 4 is a semi-schematic side elevation view illustrating use of an alternative form of the invention.

FIG. 5 is a fragmentary elevation view illustrating an alternative embodiment of the strainer support.

DETAILED DESCRIPTION

Figure 6:
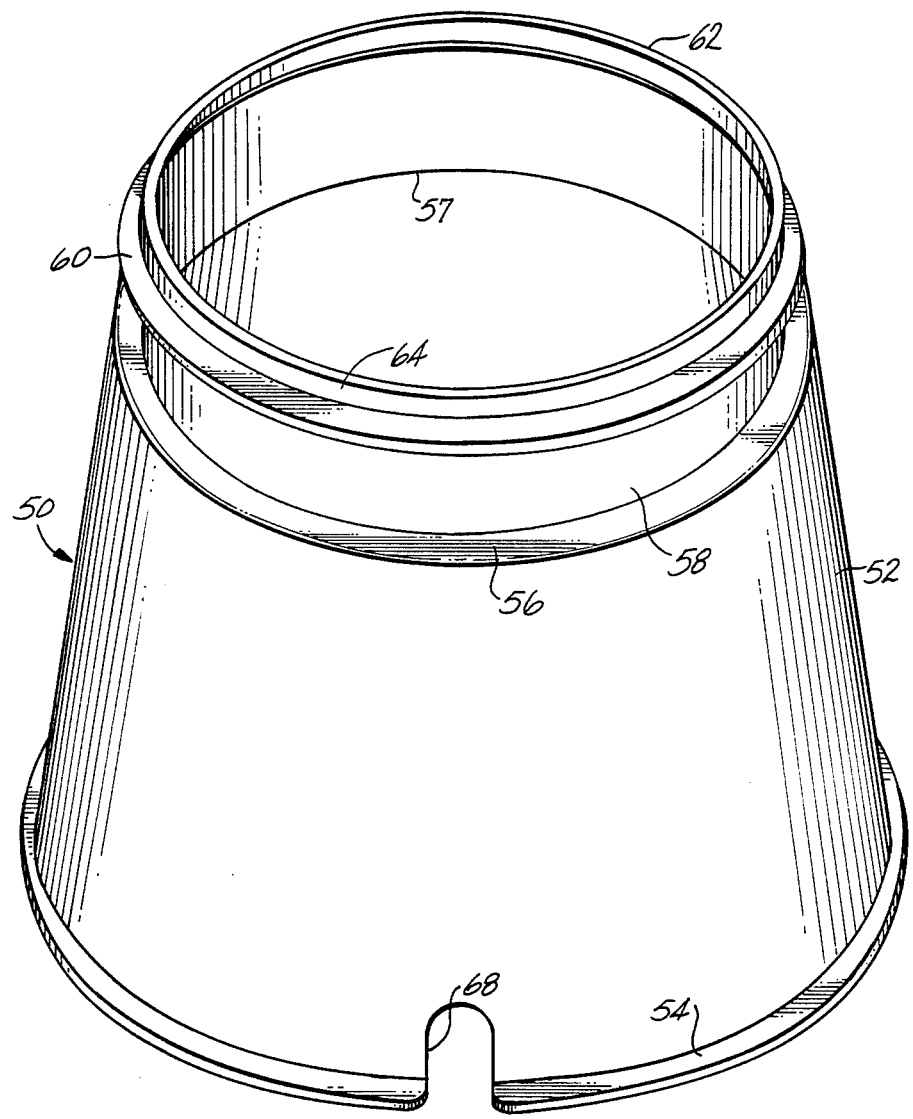
FIG. 6 is a perspective view illustrating a further alternative embodiment of the strainer support.

A strainer assembly comprises a strainer support 10 shown in FIG. 1 and a filtering medium 12 shown in FIG 2. The strainer support 10 has a continuous imperforate tubular side wall 14 which is preferably frusto-conical in shape and circular in cross section, with a relatively smaller open top 16 and a relatively larger open bottom 18. The side wall of the strainer support is rigid axially so as to be self-supporting and provide sufficient structural strength for supporting the weight of a filtering cloth during use, as described below. The conical side wall of the strainer support is preferably made from an injection molded plastic material commonly used in making plastic paint buckets. A typical wall thickness of the plastic strainer support is about 0.1 inch.

The exterior of the strainer support has an outwardly projecting lower mounting flange 20 located immediately above the open bottom 18. The lower flange is preferably integrally molded with the side wall of the support, is annular so as to extend entirely around the perimeter of the support, and has a flat bottom surface facing downwardly toward the open bottom of the support. Alternatively, the lower flange can be in several segments, at the same elevation on the support. In one embodiment, the strainer support has a height of about one foot, and the open bottom 18 has a diameter of about one foot. The lower flange is located about ¾ inch above the open bottom of the container, and the flange has a width of about ⅜ to ½ inch.

In one form of the invention, the exterior of the strainer support has an outwardly projecting upper mounting flange 22 located immediately below the open top 16 of the strainer support. The upper flange is preferably integrally molded with the side wall of the support, is annular in configuration, and has a flat surface facing upwardly toward open top of the support. Alternatively, the upper flange can be in segments, at the same elevation on the support. The upper flange 22 is preferably about the same width as the lower flange 20 and is spaced below the upper end of the strainer support by a distance similar to the spacing of the lower flange 20 above the bottom of the support.

The strainer support also can have a small opening 24 in the side wall of the support adjacent the open bottom 18. This opening extends above the lower flange 20 and allows a hose (not shown) from an airless spray gun to pass between the outside and the inside of the strainer support. The opening 24 also allows for viewing the paint level in the bottom of the paint container.

The filtering medium 12 shown in FIG. 2 comprises a thin, flexible tubular plastic bag 26 with an open top 28 having a diameter similar to the diameter of the open top 16 of the strainer support. The flexible plastic bag material, in one form of the invention, is preferably about two mil thick polyethylene plastic sheeting. The plastic sheeting is continuous and imperforate, and the length of the tube formed by the plastic sheeting is sufficient to extend most of the distance inside of the strainer support when the top of the plastic bag is affixed to the upper portion of the support. The filtering medium further comprises a flexible mesh filter cloth 30 affixed to the bottom of the plastic bag 26. The filter cloth can be any suitable fabric material that combines necessary strength with the filtering capability suitable for paint filtering. This can include a nylon mesh fabric as well as cheesecloth, for example. The preferred material is capable of being heat sealed or adhesively bonded to the plastic bag material at the interface 32 between the bottom of the plastic bag and the top of the filter cloth 30. FIG. 2 illustrates one embodiment in which the tubular plastic sheet 26 has a slight taper; alternatively, the tubular plastic upper portion can be of uniform diameter from end to end, so that its side walls extend substantially vertically, parallel to one another and generally parallel to the inside walls of the support 10 during use. The filter cloth is preferably configured so that it extends in reasonably flat form across the bottom of the plastic bag, so that when the filter is held in a normal position, the filter cloth extends in a reasonably flat plane with a normal height from top to bottom of a very short distance compared to the diameter of the filter cloth. For instance, in the illustrated embodiment, the normal height of the filter cloth should be less than one-half the radius of the filter cloth. The areal extent of the filter cloth is preferably sufficient to occupy most of the projected area within the strainer support.

Alternatively, the strainer support of this invention can be used for holding a standard paint filtering cloth comprised entirely of an elongated, porous tubular bag made of cheesecloth or a plastic mesh such as nylon or silicone and having a closed lower end and an open top.

Use of the strainer assembly is best understood by referring to FIG. 3, which shows the strainer support mounted in an upright position above an open top 34 of a container 36. The filtering medium 12 is shown secured to the open top of the support, so the plastic bag 26 and filter cloth 30 are disposed in the interior of the strainer support above the top of the container 36. This assembly is used for straining paint that can be poured through the interior of the plastic bag 26, through the filter cloth 30, and into the interior of the container 36. Preferably, the container 36 is a five-gallon paint bucket of the type commonly used commercially for containing paint. The strainer support is mounted on the top edge of the container 36 by placing the open bottom 18 of the strainer support inside the top of the container and resting the flat bottom surface of the exterior lower flange 20 on the top edge of the container. This removably mounts the strainer support in an upright position over the top of the container. The filter medium is then secured to the upper end of the strainer support by folding the upper portion of the plastic bag 26 over the top of the strainer support and down along the exterior side wall of the support below the upper flange 22. A length of masking tape 38 is then used to releasably fasten the top exterior portion of the plastic bag 26 to the outside wall of the strainer support. The outwardly projecting annular upper flange 22 provides a means for resisting any slippage of the fastened plastic bag for holding the plastic bag in a fixed position inside the strainer support during use. Alternatively, the upper flange can be used as a means for frictionally holding the top of the filter bag, without fasteners such as tape, by using the natural resilience of the plastic material stretched around the protruding upper flange.

In the prior art, a tapered filter cloth (shown in phantom lines at 40 in FIG. 3) was placed inside the empty paint bucket and used to strain the paint. The painter would pour the paint into the interior of the filter cloth so that the paint passes through the pores in the nylon mesh of the filter cloth to strain the paint. Since the prior art filter cloth is tapered to the shape of the paint bucket and extends down to near the bottom of the bucket, the painter must pour the paint into the bucket and then raise the filter cloth to eventually make sure that all the paint passes through the cloth and into the bucket. As mentioned previously, this procedure is inconvenient, messy, tedious, and it places an undue strain on the painter's back. The tapered bottom of the conventional filter cloth tends to cause paint to clog the bottom of the filter cloth, which also adds to the strain on the painter who must hold the filter cloth long enough to allow the paint to drip through it.

The filter cloth 30 of this invention is held above the top of the empty paint bucket and occupies a major portion, preferably at least 75% of the projected area inside the strainer support. Moreover, rather than being of tapered U-shaped configuration at its bottom, the filter cloth 30 extends along an essentially uniform level across this large projected area inside the strainer support. This allows for a greater area through which the paint can be poured during the filtering process, and thereby reduces clogging and allows faster straining. Moreover, the sides of the plastic bag material are imperforate, so the paint does not pass through the sides of the filtering medium and unnecessarily coat inside walls of the strainer support. In fact, the combination of the imperforate continuous plastic outer wall of the tubular strainer support and the plastic bag 26 inside the strainer support provides for an effective seal against the environment to prevent any debris from the outside or any exterior environmental conditions, such as excessive heat, from affecting the paint that has been filtered by the filter cloth 30.

The strainer support also is configured, in relation to the paint container, to provide a highly stable means of support. As shown best in FIG. 3, the bottom annular edge 18 at the lower opening in the support makes contact with the tapered inside wall of the container 36, when the bottom of the flange 20 rests on the top edge 34 of the container 36. The support can be forced down inside the container, and the semi-rigid tapered lip on the bottom of the support (below the flange) can flex inwardly and apply a somewhat springlike friction force to hold the bottom of the strainer support in a fixed, stable position on top of the container. This prevents the strainer support from having "lost motion" at the top of the container and prevents the support from being accidentally tipped over or knocked off the top of the container from an external lateral force during use. The inverted tapered strainer support and filter also have a low center of gravity during use which further adds to their stability.

Thus, the invention is especially useful in straining paint in a manner which can be accomplished quickly and easily. The strainer support is simply placed on top of the paint container, and no complex mechanical parts need to be assembled or disassembled when mounting the strainer support or removing it. Further, the filtering medium is simply used by taping it to the side of the strainer support so that, again, no complex mechanical parts need to be assembled or disassembled during use. The invention is also reasonably inexpensive inasmuch as the strainer support can be made from a commonly available plastic material used in making paint buckets. The filtering apparatus is also reasonably inexpensive and therefore capable of continuous replacement. Further, the filter and strainer support can be easily cleaned while the filter is attached to the support when the two are in the inverted position and rinsed out in a container of water.

In one embodiment of the invention, illustrated in FIG. 4, in which a single flange 20 is used at the exterior of the frustoconical shaped strainer support 14, the invention is easily adapted for stacking in a conventional paint bucket 36 when the invention is not in use. FIG. 5 illustrates an alternative embodiment of the strainer support in which the top flange 42 on the support is recessed inside the normal tapered profile 43 of the support. The outer surface of the support near its bottom is recessed at 44 to properly recess the outer extent of the flange 42. When the support is then placed inside a 5-gallon paint bucket with a tapered outer wall, the outer edge of the flange 42 does not interfere with nesting inside the bucket.

The filtering medium can be supplied with adhesive tape such as diaper tape permanently affixed to the open end of the plastic bag 26 in a position for taping around the outer side wall of the strainer support.

Figure 7:
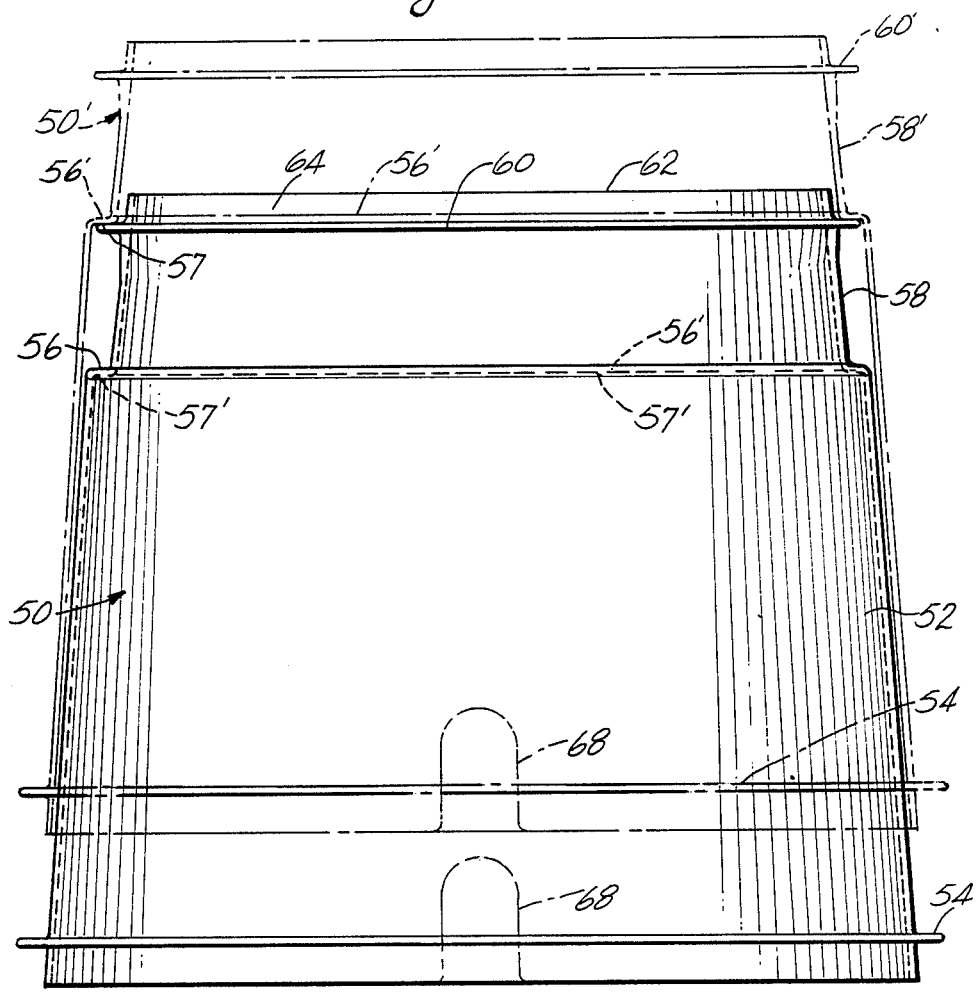
FIG. 7 is a side elevation view illustrating stacking of multiple strainer supports of the type shown in FIG. 6.

FIGS. 6 and 7 illustrate a further alternative form of the invention comprising a stackable strainer support 50 having a continuous imperforate tubular frustoconical principal side wall 52, which is circular in cross section and extends a majority of the vertical height of the support. The bottom of the support is open, and an annular lower flange 54 is molded to and extends around a lower exterior portion of the side wall 52 a short distance above the circular bottom edge of the support. The principal side wall tapers narrower above the bottom flange 54, to an annular ridge 56 at a level about 80% of the full height of the support. This annular ridge forms an abrupt, flat, annular step extending around the exterior of the support. When the support is placed in a vertical position, the step lies in a horizontal plane extending around the periphery of the support. The exterior annular ridge 56 projects into the interior of the strainer support to form an abrupt, horizontally disposed, flat, annular step 57 which faces downwardly toward the open bottom of the container.

The strainer support also includes a recessed frustoconical annular region 58 which extends above, is recessed inwardly from, and is tapered inwardly above the step-like annular ridge 56 and step 57. An annular upper flange 60 is molded to and extends around the exterior of the support immediately below an annular top edge 62 of the support. The upper flange 60 extends outwardly from an annular upper side wall 64 at the top of the support. Preferably, the upper flange 60 extends outwardly from the main axis of the support by a distance less than the outward extent of the step-like ridge 56. This provides a means by which the upper flange will not interfere with stacking of a similar support slipped over the top of the support.

The side wall of the strainer support shown in FIG. 6 also includes a bottom opening 68 to provide a means for passing a hose (not shown) from an airless spray gun between the outside and the inside of the strainer support.

The strainer support 50 shown in FIGS. 6 and 7 can be used for straining paint poured into a five-gallon container, by first placing the support over the annular top edge of the container. The lower annular flange 54 rests on the top edge of the five-gallon container to hold the strainer support in an upright position above the container. The filter medium is then placed inside the strainer support and fastened to the top of the support. Either the composite filter shown in FIG. 1, or a standard nylon mesh paint filter bag can be used, for example. The top of the filter is preferably draped over the upper outside portion of the strainer support, around and below the upper flange 60 on the support. A length of tape (not shown) is fastened around the filter below the upper flange so the upper flange provides a means for resisting movement of the filter, thereby firmly securing the upper portion of the filter to the top of the strainer support. The paint can then be poured through the lower portion of the filter cloth inside the strainer support and into the five-gallon container.

The strainer support also can be inverted to provide a means for holding a filter medium above the top of a smaller two-gallon container. In this instance, the upper flange 60 is used as a "lower mounting flange" to mount the strainer support on the annular top edge of the smaller two-gallon container. A filter is then placed inside the inverted strainer support and secured to the top of the support using the lower flange 54 (which is now at the top of the inverted strainer support) as a means for holding the upper portion of the filter to the strainer support.

The description with respect to the five and two-gallon containers is an example only, since other large and small containers of different diameters also can be accommodated by the invention.

The strainer support is of stackable configuration. As shown best in FIG. 7, a second similar strainer support 50' (shown in phantom lines) can be stacked on top of the first support by simply slipping the larger open bottom end of the second support over the narrower upper end of the first support. The second support is moved downwardly for most of the vertical height of the support until the annular step 57' on the inside of the second support engages the flat upper edge of the upper flange 56 on the first support. This interference provides a stop which holds the stacked second strainer support on top of the first support stacked below it.

By this stacking means, the strainer support provides a convenient means of supplying large numbers of the strainer supports to building and construction supply stores. The stacked strainer supports are held on top of one another principally by the interference between the annular step and upper flange, rather than by frictional contact between tapered sides of the supports. This interference between upper flange 60 and step 57 provides a positive means for engaging the stacked supports and allows the uppermost support to be taken off the top of the stack without any frictional interference from other strainer supports stacked below it.

Thus, the double-flange stackable strainer support shown in FIGS. 6 and 7 provides the following advantages: (1) a filter support which can be inverted so as to provide a means for supporting filters for straining paint into either a five-gallon or a two-gallon container; (2) the remaining flange in either orientation of the support provides a means for attaching the filter to the upper portion of the support; (3) either flange oriented at the top of the support also can be used as a handle or gripping means for use when rinsing out the filter; (4) multiple strainer supports can be stacked one upon another in a convenient stack that saves space; and (5) the large diameter flange is used as a means of support for holding the strainer in an inverted position inside an outer container used in rinsing or cleaning or for storage or transport.

Although the invention has been described in the context of paint filtering, the invention also can be used to filter other liquids, such as honey, for example.

I claim:

1. A strainer assembly for straining a liquid to be poured into the interior of either of two containers each having a respective open top of a known diameter, comprising:
   a strainer support having (a) an imperforate tubular side wall with an open top and an open bottom, (b) a first flange projecting outwardly from the tubular side wall of the support adjacent the open bottom of the support, the open bottom having a diameter greater than the diameter of the open top of the container, with the first flange projecting a sufficient distance so the flange can removably rest on the open top of a first container to hold the strainer support in an upright position above the first container, with the open bottom of the strainer support facing down toward the interior of the first container, and (c) a second flange projecting outwardly from the side wall of the support adjacent the open top of the support, the second flange projecting a sufficient distance so the flange can removably rest on the open top of a second container of smaller size than the first container to hold the strainer support in an upright position above the second container; and a filtering medium for mounting inside the strainer support above either container by releasable attachment of the medium to the end of the support opposite from the container.

2. Apparatus according to claim 1 in which the filtering medium is in a relatively flat configuration as it traverses along the bottom portion of the strainer support.

3. Apparatus according to claim 1 including a small opening near the bottom of the strainer support side wall to allow a hose to extend from the interior of the container to the exterior of the strainer support.

4. Apparatus according to claim in which the strainer support is frustoconical in shape.

5. Apparatus according to claim 1 in which a bottom edge of the open bottom of the strainer support frictionally contacts an inside wall of the first container when the flange rests on the open top of the first container.

6. Apparatus according to claim in which the first and second flanges are each annul-ar and the first flange has a diameter greater than the second flange, the strainer support side wall being tapered narrower from the first flange toward the second flange.

7. A strainer assembly for straining a liquid to be poured into the interior of a container having an open top of a known diameter, comprising:

a strainer support having an imperforate tubular side wall with an open top, an open bottom, and a flange projecting outwardly from the tubular side wall of the support adjacent the open bottom of the support, the open bottom having a diameter greater than the diameter of the open top of the container, with the flange projecting outwardly a sufficient distance so the flange can removably rest on the open top of the container to hold the strainer support in an upright position above the container, with the open bottom of the strainer support facing downwardly toward the interior of the container; and a filtering apparatus comprising a thin, flexible, tubular, imperforate plastic sheet having an open top with a diameter sufficient for attaching the flexible sheet to the open top of the strainer support by taping the top of the flexible plastic sheet to the support, the tubular portion of the flexible plastic sheet extending downwardly into the interior of the strainer support for holding a flexible filtering cloth at the bottom end portion of the flexible sheet, so the filtering cloth extends across a major portion of the projected area of the strainer support interior adjacent the top of the container.

8. Apparatus according to claim 7 in which the filter cloth has a relatively flat configuration as it traverses the bottom portion of the flexible sheet.

9. Apparatus according to claim 7 in which the flange is a flat annular flange.

10. Apparatus according to claim 7 including a second, flat annular flange projecting outwardly near the open top of the strainer support for use in attaching the open top of the filter to the support.

11. Apparatus according to claim 7 including a small opening near the bottom of the strainer support side wall to allow a hose to extend from the interior of the container to the exterior of the strainer support.

12. A strainer support for straining a liquid to be poured into the interior of either of two containers each having a respective open top of a known diameter, in which the strainer support comprises:

an imperforate tubular side wall with an open top and an open bottom;

a first flange projecting outwardly from the tubular side wall of the support adjacent the open bottom of the support, the open bottom having a diameter greater than the diameter of the open top of the container, with the first flange projecting a sufficient distance so the first flange can removably rest on the open top of a first container to hold the strainer support in an upright position above the first container, with the open bottom of the strainer support facing down toward the interior of the first container;

a second flange projecting outwardly from the side wall of the support adjacent the open top of the support, the second flange projecting a sufficient distance so the second flange can removably rest on the open top of a second container of smaller size than the first container to hold the strainer support in an upright position above the second container; and an annular step inside the strainer support side wall near the open top of the support for resting on the second flange of a similar strainer support stacked below it by an interference fit between the step and the second flange, the first and second flanges providing separate means for holding a filter medium inside the interior of the strainer support above either the first or the second container when the flange at the opposite end of the strainer support is used as a means for securing the strainer support over its respective container.

13. Apparatus according to claim 12 in which the strainer support is frustoconical in shape.

14. Apparatus according to claim 12 in which the first and second flanges are each annular and the first flange has a diameter greater than the second flange, the strainer support side wall being tapered narrower from the first flange toward the second flange.

15. A filtering apparatus for use in filtering liquids, comprising a thin, flexible, tubular, imperforate plastic sheet having an open top with a diameter sufficient for attaching an upper portion of the flexible plastic sheet to the open top of a strainer support positioned around the outside of the filtering apparatus, the tubular portion of the flexible plastic sheet being adapted for extending downwardly into the interior of the strainer support, and a flexible filtering cloth at the bottom end portion of the flexible plastic sheet, the filtering cloth extending across a major portion of the projected area of the strainer support, the upper portion of the flexible plastic sheet being adapted for attachment to the strainer support holding the filtering cloth above the top of a container.

16. Apparatus according to claim 15 in which the filter cloth has a relatively flat configuration as it traverses the bottom portion of the flexible plastic sheet.

17. Apparatus according to claim 15 in which the filter cloth comprises a mesh-like material.

18. Apparatus according to claim 15 in which the periphery of the filter cloth is bonded to a lower annular portion of the plastic sheet.

19. Apparatus according to claim 15 in which the filter cloth is heat sealed to the plastic sheet.

* * * * *

UNITED STATES PATENT AND TRADEMARK OFFICE
CERTIFICATE OF CORRECTION

PATENT NO. : 4,946,591

DATED : August 7, 1990

INVENTOR(S) : Andrew N. Mealey

It is certified that error appears in the above-identified patent and that said Letters Patent is hereby corrected as shown below:

On the Title Page:

[54] Title; change "INPERFORATE" to -- IMPERFORATE --.

Abstract, line 9, change "ebmodiment" to -- embodiment --.

Column 1, line 1, in the title change "INPERFORATE" to -- IMPERFORATE --.

Column 9, line 29, after "claim" and before "in" insert -- 1 --.

Column 9, line 35, after "claim" and before "in" insert -- 1 --.

Column 9, line 36, change "annul-ar" to -- annular --.

Signed and Sealed this

Twenty-first Day of April, 1992

Attest:

HARRY F. MANBECK, JR.

*Attesting Officer*  *Commissioner of Patents and Trademarks*